Figure 1:
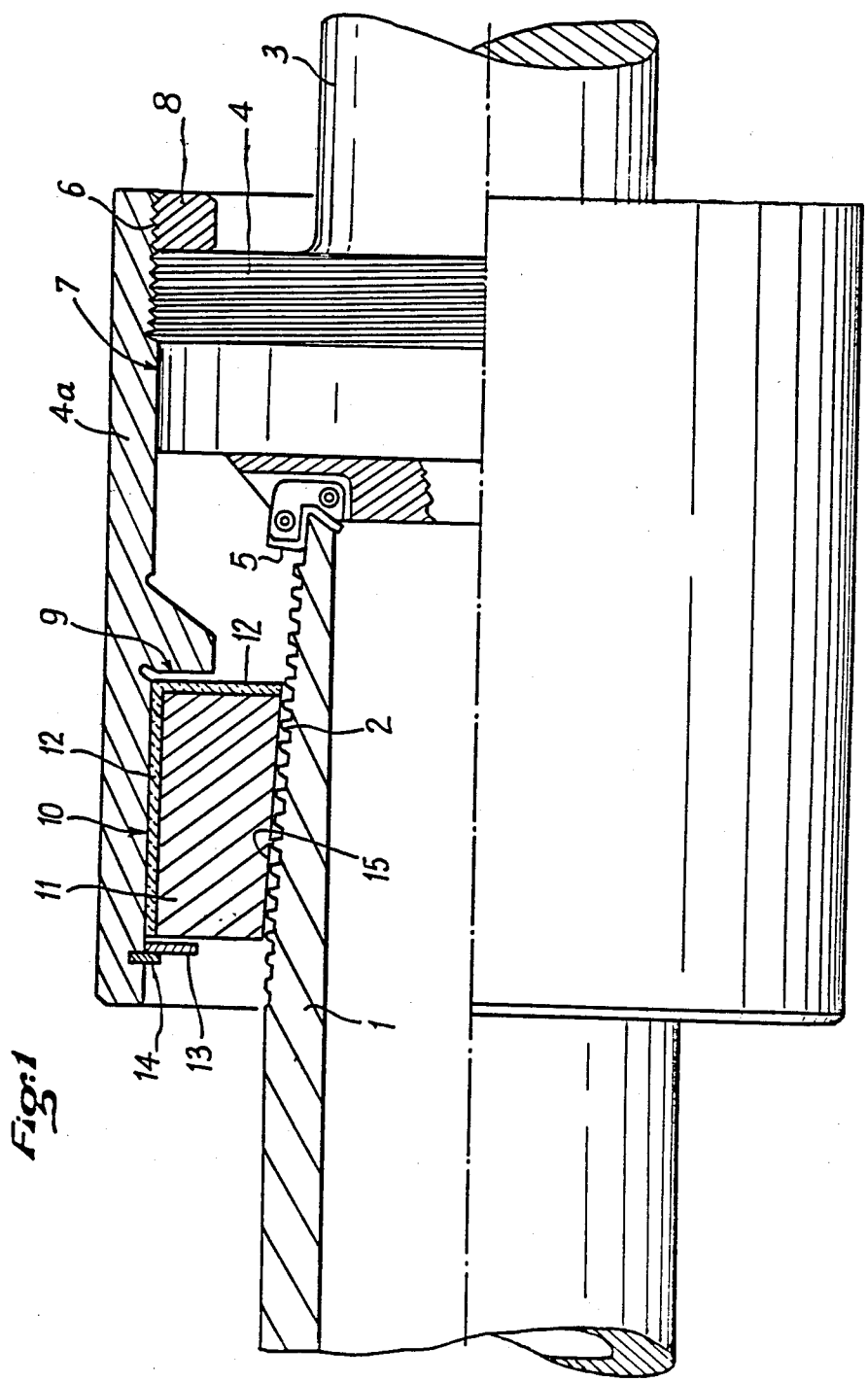

United States Patent [19]

Plaquin et al.

[11] Patent Number: 4,665,780
[45] Date of Patent: May 19, 1987

[54] METHOD OF MACHINING THREADED PIPE-ENDS

[75] Inventors: Bernard Plaquin; Louis Fradin, both of Aulnoye, France

[73] Assignee: Vallourec, Paris, France

[21] Appl. No.: 746,401

[22] Filed: Jun. 19, 1985

[30] Foreign Application Priority Data

Jun. 19, 1984 [FR] France .................... 84 09566

[51] Int. Cl.[4] .............. B23B 1/00; B23B 5/16
[52] U.S. Cl. ................... 82/1 C; 82/4 C; 408/80; 408/83; 409/185
[58] Field of Search ......... 82/4 R, 4 C, 1 C, 36 R; 408/79-83.5, 241 S; 409/185

[56] References Cited

U.S. PATENT DOCUMENTS

| | | |
|---|---|---|
| 2,094,491 | 9/1937 | Janata . |
| 2,211,183 | 8/1940 | Tytus et al. . |
| 2,218,147 | 10/1940 | Greenwood .................. 82/4 R |
| 2,528,474 | 10/1950 | Moore ........................... 82/4 R |
| 3,124,024 | 3/1964 | Pittman . |
| 3,561,302 | 2/1971 | Keener .......................... 82/4 R |
| 3,691,882 | 9/1972 | Massey .......................... 82/4 C |
| 3,717,055 | 2/1973 | Pendleton . |
| 3,994,516 | 11/1976 | Fredd . |

Primary Examiner—Nicholas P. Godici
Assistant Examiner—Jerry Kearns
Attorney, Agent, or Firm—Arnold, White & Durkee

[57] ABSTRACT

The invention concerns a process for machining a joint element for steel tubes, intended in particular for the petroleum industry, containing a truncated surface (2) and at least one screw stop.

One first carries out final machining of a truncated surface (2) that contains the element (1) and premachining of the screw stop or stops of this element; one applies on said truncated surface (2) a collar (11) of the same conicity as that of this surface, installed so as to rotate and move axially relative to the spindle (3) that carries the machining tool or tools (5) of the screw stop or stops; at the same time as one imparts to the joint element (1) a rotary movement relative to said spindle (3), one causes relative axial movement of the tool holder spindle (3) and the joint element so as to carry out final machining of the screw stop or stops of the joint element until the conical collar (11) applied on said truncated surface (2) represents a stop that opposes final relative axial movement of the tool holder spindle relative to the machined element.

8 Claims, 2 Drawing Figures

METHOD OF MACHINING THREADED PIPE-ENDS

The present invention concerns a new process for machining elements of a joint for steel tubes, especially those intended for the petroleum industry, which contains at least one threading, one truncated surface and at least one screw stop, as well as a device for implementation of this process.

In the petroleum industry joints for steel tubes are now used in which the elements of the tubes are assembled by means of truncated male and female threadings and in which there is at least one pair of stops that cooperate on the male element and on the female element to ensure limitation of screwing.

Joints are therefore known in which one connected tubes with truncated threadings and in which the end of the male element stops against a shoulder located within the female element.

There are also joints of this type in which there is also a shoulder for screw stopping on the male element, a shoulder against which the end of the female element rests during screwing.

With the manufacturing processes now known the machining tolerances are such that it is difficult to precisely position the screw stops relative to the truncated threadings, on the one hand, and the stops with respect to each other, on the other hand.

In practice this is conveyed by the fact that in the same batch of reputedly identical joint elements, certain pairs of male and female elements give rise to substantial radial interference at the level of the threadings, whereas other pairs of elements only give rise to relatively weak radial interference.

Major difficulties therefore arise in determining the optimum clamping torque of the joint which on the one hand would permit proper tightness of the joint and on the other avoidance of deterioration of the stop surfaces.

It is still more difficult to obtain sufficiently low machining tolerances in the case of joints that contain several pairs of screw stops so that each of the pairs assumes the part assigned to it in the final clamping torque of the joint. In practice it has been essentially necessary to dispense with the simultaneous use of several pairs of screw stops, being content in general with having one pair of principal screw stops, the other pair of stops, if present, serving only as additional security in the case where excessive screwing will be applied to the joint, this security additionally being imperfect and not permitting avoidance of plastic deformations in the first pair of stops.

The process according to the invention ensures precise positioning of the screw stops, on the one hand relative to the truncated threading, and on the other hand between the screw stops that can exist on the same joint.

The object of the present invention is a process for machining a joint element for a steel tube intended in particular for the petroleum industry, containing a truncated surface and at least one screw stop, characterized by the fact that one first carries out final machining of a truncated surface that contains the joint element and premachining of the screw stop or stops of the element; that one applies on said truncated surface a collar having the same conicity as that of the latter installed to rotate and move axially relative to the spindle that carries the machining tool or tools of the screw stop or stops; that by imparting a rotary movement to the joint element relative to said spindle one causes a relative axial displacement of the tool holder spindle and the rotated tube in order to achieve final machining of the screw stop or stops of the joint element until the conical collar applied to said conical surface represents a stop that opposes a final relative axial displacements of the tool holder spindle relative to the machined element.

One sees that, by virtue of this process, one stops final machining of the stop or stops (that is, one determines the position of the stop or stops) at a well defined site relative to the threading, which permits ensurance of an essentially constant radial interference of the male and female elements at the level of the threadings for contact of the stops during screwing of the joint.

One also notes that in the case where several screw stops are present on the same element, these stops are at constant predetermined distances, because they are machined simultaneously by means of tools attached to the same tool holder spindle.

Another object of the present invention is a device for employing the process discussed above, this device being characterized by the fact that it contains a rotating clamping jaw, capable of rotating the joint element being machined and a tool holder spindle equipped with a tool for final machining of the surfaces of the screw stop or stops that the joint element contains, said tool holder spindle also containing a collar having a support surface of truncated shape whose conicity is the same as that of the element's threading, said collar being capable of rotating around its axis relative to the tool holder spindle and sliding axially relative to the latter, said collar preferably being spun elastically relative to the tool holder spindle in the direction of the joint element being machined, a pair of integral stops of said collar and said tool holder interrupting advance of the tool holder spindle during final machining of the surface or surfaces of the screw stops of the joint element.

The invention can be applied to machining of joints in elements in which the threadings and the stop or stops are made in the thickness of the tubes after possible upsetting and forging of the end of the latter.

The invention can also be applied to composite joints in which the stops can be made by attached elements such as screwed or glued sleeves.

In a preferred version of the invention the truncated surface machined beforehand on the joint element consists of the crests of threads making up the conical threading of the element, or the crests of certain threads (especially of the ends) that define a conical surface on a threading that is cylindrical overall.

In this manner one can obtain precise positioning of the screw stops relative to the threadings.

In one variant of the invention one can use a conical collar which, instead of being applied against the threading, is applied against a surface of conical tightness that has been machined beforehand on the considered joint element.

One thus obtains strict positioning of the stops relative to the conical sealing surfaces.

This variant can be used in particular in the case of cylindrical threadings and especially in the case of staggered cylindrical threadings that are separated by conical sealing surfaces.

In order to provide a better grasp of the invention several versions will now be described, given as examples and shown in the enclosed drawing as an illustration with no limiting characteristics.

Figure 2:
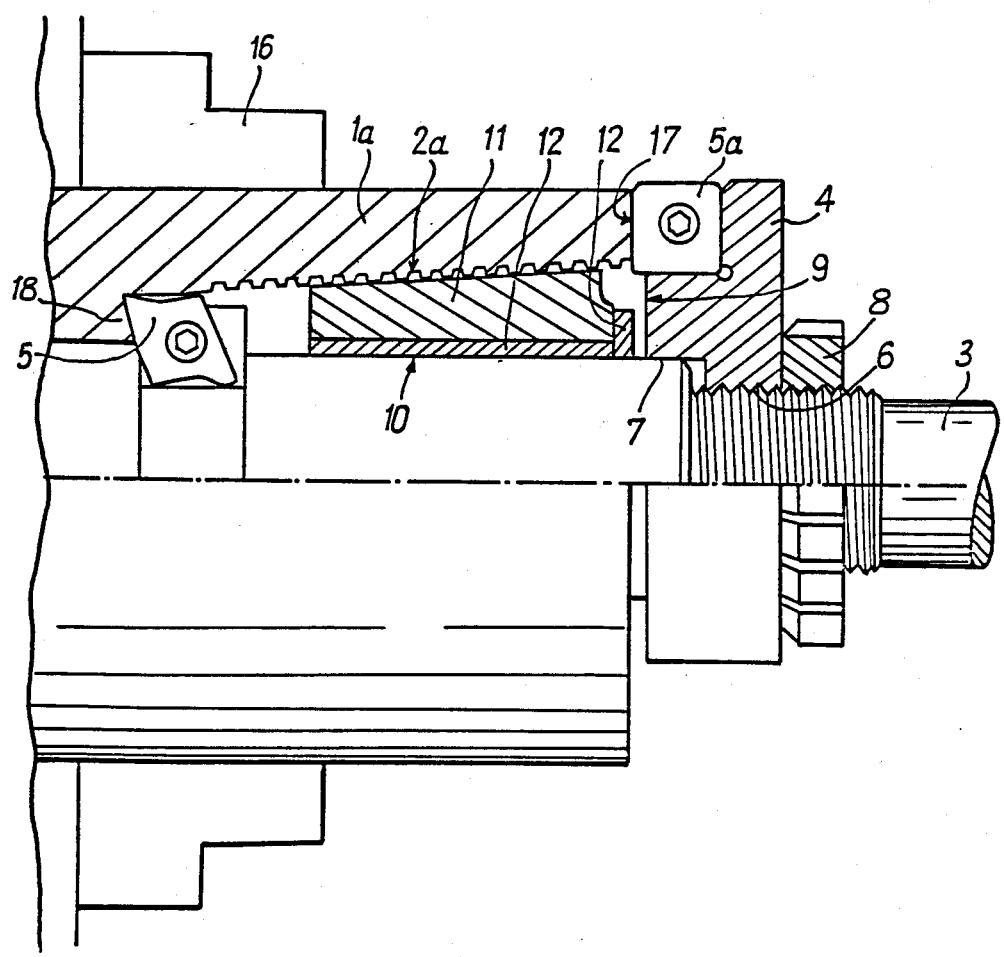

In this drawing:

FIG. 1 is a schematic half cross section of a device according to the invention that carries out machining of a male joint element containing a single stop on its end, FIG. 2 is a schematic half cross section of a device according to the invention that carries out simultaneous machining of two stops on a female element containing an internal conical threading.

One sees in the half section in FIG. 1 the end of the male element 1 on which the conical external threading 2 has already been finally machined.

The tool holder spindle 3 contains a plate 4 on which a tool 5 is attached whose shape corresponds to that which one wishes to impart to the end of the male element 1 which must be finally machined after a premachining.

A cylindrical sleeve 4a is attached in a predetermined position on plate 4 of the tool holder spindle. This attachment is achieved by screwing in threadings 6, whereas one part of plate 4 is shrunk onto a cylindrical bore 7 of sleeve 4a.

A blocking collar 8 forming a stop is screwed into threading 6 of sleeve 4a so as to immobilize sleeve 4a relative to plate 4 in a controllable and predetermined position.

Sleeve 4a contains an internal stop 9 that serves, as will be discussed hereafter, to limit advance of tool 5 during machining.

Sleeve 4a also contains in front of stop 9 a cylindrical bore 10 within which a collar 11 equipped on its periphery and on its rear face with antifriction coating 12 can pivot around its axis and move axially. A stop 13 held by a clip 14 prevents collar 11 from leaving sleeve 4a.

By virtue of blocking collar 8 one attaches sleeve 4a relative to plate 4 in a position so that, when collar 11 rests against the advance stop 9 of sleeve 4a, the end of tube element 1 is finally machined in the position one desires to impart to it relative to threading 2.

The inside surface 15 of collar 11 has a truncated shape whose conicity is equal to that of threading 2 so that during machining the truncated surface 15 rests against the crest of the threads of threading 2.

According to the invention, it is advantageous that an elastic means (not shown) constantly forces collar 11 in a direction opposite to tool 5.

In one variant the truncated surface 15 of collar 11 can rest against the truncated part of the crests of the threads of threading 2 which will be located near the end of tube 1, threading 2 then being cylindrical, but with truncated thread crests at the end of the threading.

FIG. 2 schematically depicts a half section of another device according to the invention that permits final machining of the surfaces of stop 17 and 18 which are found on a female element 1a equipped with internal truncated threading 2a.

The female element 1a is held by rotating clamping jaws 16 in the axis of the tool holder spindle 3 which is equipped with a cylindrical part 10 on which a collar 11 provided with antifriction coatings 12 slides and whose outside surface has a truncated shape whose conicity is equal to that of threading 2a of the female element.

A plate 4 that carries a tool 5a is mounted on the tool holder spindle 3 by a cylindrical bearing surface 7 and by a threading 6, whereas a counternut 8 ensures blocking of plate 4 in a position that corresponds to the distance one desires to obtain between the surfaces of stops 17 and 18 of the female that are finally machined by tools 5 and 5a.

As in the preceding case shown in FIG. 1, the sliding collar 11 is preferably forced in the direction of tool 5 by an elastic component not shown.

As soon as the tool holder spindle shifts in the direction of the bearing surfaces of the screw stop being machined, the conical outside surface of collar 11 rests against the crests of the threads of threading 2a whose machining is completed.

Tools 5 and 5a then shift to the left, machining stops 17 and 18, as well as the sealing surfaces for tool 5 that are near stop 18. This is naturally final machining, premachining having been carried out beforehand.

Whereas collar 11 rotates relative to the tool holder spindle 3 which is shifted to the left, ensuring final machining of stops 17 and 18, as explained, machining stops automatically in the chosen position when stop 9 of plate 4 rests against the corresponding face of collar 11.

In the described versions the limitation of advance of machining of the stops is ensured by physical contact of collar 11 on the integral stop 9 of the tool holder spindle.

However, it is clear that this limitation can be obtained by any other appropriate means. Thus, for example, one can provide a mechanical stop positioned initially by a spring that is compressed during machining, a stop with ball bearings, needles or rollers being interposed between the mechanical stop and the collar. A stop with a controllable electrical contact is advantageously provided and controlled so as to anticipate the mechanical stop by a few hundredths of a millimeter. The electrical contact obtained can be used to stop advance of the device without interrupting rotation of the joint element during machining.

One sees that it is possible by virtue of the invention to machine by simple means screw stops that are positioned in precise fashion both relative to the threading of the joint element and each other.

One can thus produce joints with the invention in which the manufacturing tolerances are much more restrained, which permits more easy determination of the zone of optimum screwing torque and imparts to this zone a much greater range, which facilitates clamping of joints in the field.

Finally, it is clear that the movements of the tool holder spindle, the truncated collar and the tubular element are relative movements and that the parts in movement and the fixed parts can be inverted without departing from the scope of the invention.

We claim:

1. A process for machining a screw stop for a pipe joint having correspondingly tapered male and female elements, said process including the steps of:
   machining a tapered surface of one of said male and female elements to a final configuration;
   premachining a screw stop on said element;
   engaging a collar on said tapered surface, said collar having a tapered surface complimentary to the tapered surface of said element;
   positioning a spindle supporting a tool for machining said screw stop coaxially with said collar, said collar being free to rotate and move axially with respect to said spindle;
   imparting to said spindle a rotation and an axial displacement for performing the final machining of said screw stop; and interrupting said final machining at a predetermined position when a face of said collar engages a stop on said spindle.

2. A process according to claim 1 to wherein said tapered surface comprises thread crests of a tapered threading.

3. A process according to claim 2 wherein said tapered surface comprises crests of a taper-like truncated section of a cylindrical threading.

4. A process according to claim 1 wherein said tapered surface comprises a tapered sealing surface.

5. A process according to claim 4 wherein said tapered sealing surface is adjacent to one end of a cylindrical threading.

6. A process according to claim 4 wherein said tapered sealing surface is located between two sections of cylindrical threadings.

7. A process according to claim 1 wherein said spindle includes a second tool for simultaneously machining a second screw stop.

8. An apparatus for machining a screw stop for a pipe joint having correspondingly tapered male and female elements, said apparatus comprising:
- a collar for engaging a tapered surface of one of said male and female elements;
- a spindle positioned coaxially with said collar such that said collar is free to rotate and move axially with respect to said spindle;
- a tool positioned on said spindle for machining said makeup limiting shoulder; and
- a stop on said spindle for engaging said collar when said screw stop is machined to a predetermined position with respect to said tapered surface.

* * * * *